United States Patent [19]

Krause et al.

[11] 4,101,293
[45] Jul. 18, 1978

[54] STABILIZING EMULSIFIERS

[75] Inventors: Arthur Waldemar Krause; John Korose, both of Gulf Breeze, Fla.

[73] Assignee: Reichhold Chemicals, Inc., White Plains, N.Y.

[21] Appl. No.: 782,634

[22] Filed: Mar. 30, 1977

[51] Int. Cl.$^2$ .......................... C10L 1/18; C10L 1/32
[52] U.S. Cl. .......................................... 44/51; 252/356
[58] Field of Search ............................. 44/51; 252/356

[56] References Cited

U.S. PATENT DOCUMENTS

| | | | |
|---|---|---|---|
| 1,390,230 | 9/1921 | Bates | 44/51 |
| 2,397,859 | 4/1946 | Hersberger et al. | 44/51 |
| 2,671,758 | 3/1954 | Vinograd et al. | 44/51 |
| 2,684,338 | 7/1954 | McGowan et al. | 252/356 |
| 3,703,481 | 11/1972 | Barker et al. | 252/356 |
| 3,732,084 | 5/1973 | Nixon et al. | 44/51 |

*Primary Examiner*—Daniel E. Wyman
*Assistant Examiner*—Y. Harris-Smith

[57] ABSTRACT

This invention relates to the preparation and use of a novel emulsifier for use in formulating storage stable coal and oil fuel mixtures. The stabilizer is prepared by reacting blends of unsaturated aliphatic and cycloaliphatic carboxylic acids with alkali metal hydroxides or amines. This stabilizing emulsifier allows for the preparation of coal and oil fuel mixtures containing up to 50 parts by weight of coal which possess superior storage stability over wide temperature ranges without the coal settling out, which undergo clean combustion thus reducing the increased air pollution normally associated with the combustion of coal or coal containing fuels and which may be used in conventional oil burning furnaces with a minimum of modification.

23 Claims, No Drawings

STABILIZING EMULSIFIERS

This invention is directed to the preparation and use of a novel stabilizing emulsifier for use in preparing coal in fuel oil slurry emulsions. These slurries may be used as fuel in normally fuel oil fired installations for use in producing heat energy. The novel stabilizing emulsifier of this invention allows for the preparation of storage stable coal and fuel oil slurries which have heretofore not been practical.

Attempts have been made to perpare coal and fuel oil slurries in the past. It has been reported that during World War I work at the Kodak Research Laboratories showed that a suspension of coal and fuel oil could be used to fire ships' boilers. Such a fuel slurry was burned on the USS Gem in 1918. Further Kodak research work indicated that the coal and fuel oil product could be stabilized for a number of months via the use of emulsifiers. In later years experiments were conducted in the U.S., Germany and England to develop coal and fuel oil slurries which could be used on a practical scale to fire boilers. Considerable work was done using various types of coal and oil and additives. In addition, work was done to modify the boiler burners to better utilize the coal and fuel slurry. The conclusion on this extensive work indicated that the use of coal in fuel oil slurries for burning in boilers to produce heat energy was feasible. However, a number of problems existed which could not be overcome.

One of the problems discovered was that the coal in fuel oil slurries were not storage stable. After a varying period of time, the coal would separate from the fuel oil forming a stratification of the slurry in the storage tanks. Various emulsifiers were tried, but none successfully overcame the problem. Other problems during the combustion of the coal and fuel oil slurry were boiler tube erosion and corrosion, slagging of the boiler tubes and considerable ash accumulation on the burner floors. In addition, excessive particulate and gasses were vented into the atmosphere. The use of the coal and fuel oil slurries also added considerable wear to the burner equipment such as the transfer pumps, burner nozzle tips, filters and the like. In addition, the incomplete atomization of the slurries prevented full utilization of the heat value in the fuel mixture.

While previous work included the use of various additives such as stabilizers to overcome these difficulties and the addition of water, none of these previous systems were able to overcome these deficiencies so that a commercially suitable coal and fuel oil slurry could be manufactured, transported, stored and used in industrial boilers for production of heat energy.

Now, however, it has been found that through the use of a novel stabilizing emulsifier commercially viable coal and fuel oil slurries can be prepared and used in conventional fuel oil burning boilers to produce heat energy. Through the use of this stabilizing emulsifier homogenous coal and fuel oil slurries can be prepared which may be automatically metered to the combustion boilers. Furthermore, the coal and fuel oil slurries can be prepared in advance and stored without agitation. Additionally, the coal and fuel oil slurries are storage stable under a wide variety of temperature ranges. The coal and fuel oil slurries prepared according to this invention may be pumped through pipe lines and transported by truck and rail without special handling or settling. Another advantage is that the coal and fuel oil slurries will not foul or plug fuel handling systems thus allowing the fuel transfer equipment to be stopped and started at will as required. An additional advantage is that relatively small users of fuel could purchase and store already prepared coal and fuel oil slurries thus eliminating the need for costly preparation equipment which has been envisioned heretofore as being necessary to prepare coal and fuel oil slurries on site. An even further advantage of this invention is that the stabilizing emulsifier and the coal and fuel oil slurries prepared with its use provides antifriction properties thus reducing corrosion and wear in the oil transfer systems. Normally, considerable wear would be associated with the use of solids being handled in a system designed for liquids. These and other advantages become apparent through the detailed description of the invention as follows.

In its simplest form, this invention relates to the production of a novel stabilizing emulsifier which may be prepared by reacting blends of unsaturated aliphatic and cycloaliphatic carboxylic acids with alkali metal hydroxide or amines. This emulsifier is then used to prepare coal and fuel oil slurries which may contain up to 50 parts by weight of coal. In addition, this emulsifier allows the addition of water which aids in the combustion properties of the mixture. The coal and fuel oil slurries prepared according to this invention and utilizing this stabilizing emulsifier possess superior storage stability over wide temperature ranges without the coal settling out.

Typically, the emulsifier is prepared by charging 1 part of crude tall oil into a reactor while stirring. Temperature is increased and 1 part of amine is charged slowly into the reaction kettle. After the addition is complete, agitation is continued without heat for approximately 1 hour. The material is then cooled and transferred to storage. Depending on the amine used to react with the crude tall oil, it is also possible to prepare the emulsifier in a continuous manner. In this instance, the crude tall oil would be metered through a proportioning pump into a static mixer. Prior to entering the static mixer, the crude tall oil would be pumped through a heat exchanger to raise the temperature. At the same time the amine is pumped through a proportioning pump into the static mixer. The reaction which is slightly exothermic will take place in the static mixer. The product coming from the mixer is pumped directly to storage.

To prepare coal and fuel oil slurries according to this invention, the fuel oil is heated and agitated vigorously while a predetermined amount of the stabilizing emulsifier as well as water is added. Then, powdered coal is added and other desired additives. The agitation is continued until dispersion is complete. The resulting fuel mixture is ready for use or it may be stored or transported to toher destinations for use.

One of the novel features of this invention is that crude tall oil may be used in preparing the emulsifier although tall oil in any of its various states of refinement may be employed. Also, our method is applicable to mixtures of fatty acids having different boiling points as well as to tall oil. However, since the method is particularly applicable to tall oil, it will be described in connection with tall oil.

As is well known, tall oil is a by-product in the making of sulfate, or kraft, pulp by the cooking of coniferous woods, particularly jack pine, by the use of sodium sulfide-sulfate-alkaline cooking liquors. As a result of such cooking procedures, a "soap" is formed that comprises a mixture of saponified fatty and resin acids and is recovered from the spent cooking liquor as "skimmings." By acidification of the skimmings, the free fatty and resin acids are released and isolated as so-called tall oil.

The composition of crude oil varies considerably, but, in general, has an analysis within the following ranges expressed as percentages by weight:

|  | Percent |
|---|---|
| Rosin acids (R.A.) | 35–55 |
| Fatty acids (F.A.) | 35–50 |
| Unsaponifiables and neutrals (U.) | 10–15 |

The fatty acids are largely composed by linoleic, linolenic and oleic acids, as the unsaturated fatty acids, and saturated fatty acid such as palmitic and stearic. The resin and those commonly known as rosin acids and include abietic acid.

We prefer to start with a crude tall oil that has not been subjected to resolution prior to distillation.

However, various distilled tall oil fractions may also be used. Examples of various fractions which may be used and are normally obtained from the distillation of a crude tall oil include:

(1) A first side stream product in which the following range of composition is typical:

|  | Percent |
|---|---|
| R.A. | 24–29 |
| F.A. | 73–69 | and more preferably:

|  | Percent |
|---|---|
| R.A. | 13 |
| F.A. | 85 |

(2) A second side stream product of substantially pure fatty acids comprising:

|  | Percent |
|---|---|
| R.A. | 1 |
| F.A. | 97 |

(3) A tall oil pitch of about 40° C melting point comprising:

|  | Percent |
|---|---|
| R.A. | 30 |
| F.A. | 10 |

(4) A first tall oil heads fraction comprising:

|  | Percent |
|---|---|
| R.A. | 3 |
| F.A. | 70 |

(5) A second tall oil heads fraction comprising:

|  | Percent |
|---|---|
| R.A. | 1 |
| F.A. | 81 |

(6) Various fatty acid-rosin acid mixtures such as the following:

|  | Percent |
|---|---|
| R.A. | 65 |
| F.A. | 30 |

(7) A second tall oil bottoms of residue comprising:

|  | Percent |
|---|---|
| R.A. | 45 |
| F.A. | 45 |

These fractions also certain varying amounts of unsaponifiables and neutral materials. However, unsaturated and/or saturated carboxylic acids, or blends thereof or blends with crude tall oil or rosin acids containing from about 5 to about 36 carbon atoms and mixtures thereof may be used in place of the crude tall oil.

The crude tall oil, distilled tall oil fractions or individual or blends of ethylenically unsaturated or ethylenically polyunsaturated aliphatic carboxylic acid or cycloaliphatic carboxylic acid is reacted with a basic material such as an alkali metal compound and/or amine. The alkali metal compound may be added as finely divided particulate form or more preferably in any readily solubilized form such as a metal hydroxide or the salt of an organic carboxylic acid. Typical compounds would include sodium hydroxide, potassium hydroxide and calcium hydroxide and mistures thereof. These hydroxides are the preferred alkali metal compounds.

In addition, various amines may be used to be reacted with the tall oil. In general, the majority of amines or amine blends may be used as long as the resulting reaction product between the tall oil or acid is low foaming. Amines which are preferred include triethanolamine, monoethanolamine, isopropanolamine and isomers thereof and diethanolamine. Blends of these amines may also be used.

The amount of alkali metal compound or amine reacted with the carboxylic acid or blends may vary. If an alkali metal hydroxide containing compound is used, it is preferred to use from about 0.1 to about 2 parts by weight calculated on the metal. If an amine is used, it is preferred to use from about 0.5 parts to about 2 parts amine for each part of carboxylic acid containing compound that is used. If triethanolamine, monoethanolamine, isopropanolamine or diethanolamine is used, it is preferred that the ratio of tall oil or acid compound to amine be about 1 to 1. However, it may be 2 to 1. Neutralized materials and amine reaction products may be blended in order to enhance synergism of the stabilizing emulsifiers.

Emulsifiers can be made at temperatures ranging from about room temperature to about 200° C. The preferred temperature ranges from about 70° C to 100° C. During the reaction which is slightly exothermic, the temperature may rise slightly higher. It is preferred that

EXAMPLE III

Utilizing the reaction vessel of Example I, the following emulsifiers were prepared:

| EXAMPLE | | III | IV | V | VI | VII | VIII | IX | X | XI | XII | XIII | XV | XIX | XX | XXI | XXII | XXIII | XXIV | XXV |
|---|---|---|---|---|---|---|---|---|---|---|---|---|---|---|---|---|---|---|---|---|
| Reaction Temp. | °C | 100 | 100 | 100 | 165 | 100 | 165 | 165 | 100 | 100 | 165 | 165 | 100 | RT | RT | 100 | 165 | RT | 200 | 65 |
| Water | g. | 516 | 510.6 | 500 | 500 | 500 | 500 | 500 | 500 | 500 | 500 | 500 | 500 | 50 | 50 | | | | | (175) |
| 50% NaOH | g. | 106.4 | 71.7 | | | | | | | | | | | | | | | | | |
| Triethanolamine | g. | | | 35 | 35 | 21 | 33 | 50 | 50 | 50 | 50 | 50 | 33 | 33 | 33 | 225 | 225 | | | 50 |
| Crude Tall Oil | g. | 500 | | | | | | | | | | 25 | | | | | | | | |
| A | g. | | 250 | | | 41 | | | | | | | | | | | | | | |
| FF-Wood Rosin | g. | | 250 | | 65 | 38 | 67 | | 50 | | 25 | | 67 | 67 | 67 | | | | | |
| B | g. | | | 65 | | | | | | | | | | | | | | | | |
| C | g. | | | | | | | | | 50 | 25 | | | | | | | | | |
| 1) Dow - DowFax-2A1 | g. | | | | | | | | | | | | | 60 | 60 | | | | | |
| 2) Dow - XD-8390 | g. | | | | | | | | | | | | | | | 430 | 430 | 200 | 200 | 200 |
| E (50)% | g. | | | | | | | | | | | | | | | | | | 32 | |
| Diglycolamine | g. | | | | | | | | | | | | | | | | | | | 100 |
| Fuel Oil No. 6 | g. | | | | | | | | | | | | | | | | | | | |

A = Crude tall oil pitch a mixed blend of large fatty and rosin acids.
B = Blend of tall oil fatty acids containing about 5% rosin acids.
C = Mixed blend of palmitic, palmitoleic, stearic and oleic acids from the heads cut from distillation of crude tall oil.
D = Blend of tall oil fatty acids containing about 25% rosin acids.
E = Sodium salt of pulp mill liquor containing a mixture of fatty acids and rosin acids.
1) Surfactant manufactured by the Dow Chemical Company - Midland, Michigan.
2) Surfactant manufactured by the Dow Chemical Company - Midland, Michigan.
RT = Room temperature.

Results of storage test using the various emulsifiers prepared according to the preceding example:

| EMULSIFIER USED | III | IV | V | VI | VII | VIII | IX | X | XI | XII | XIII | XV | XIX | XX | XXI | XXII | XXIII | XXIV | XXV |
|---|---|---|---|---|---|---|---|---|---|---|---|---|---|---|---|---|---|---|---|
| Parts Fuel Oil/Coal Slurry(1) | 94 | 94 | 94 | 94 | 94 | 94 | 94 | 94 | 94 | 94 | 94 | 94 | 94 | 94 | 98 | 98 | 94 | 98 | 95.8 |
| Parts Water | 3 | 3 | 5 | 5 | 5 | 5 | 5 | 5 | 5 | 5 | 5 | 5 | 4 | 4 | 0 | 0 | 3 | 0 | 0 |
| Parts Emulsifier | 3 | 3 | 1 | 1 | 1 | 1 | 1 | 1 | 1 | 1 | 1 | 1 | 2 | 2 | 2 | 2 | 3 | 2 | 4.2 |
| 4 Weeks at 75° C | F | F | VF | VF | VF | VF | VF | F | F | VF | VF | VF | VF | F | F | PS | PS | R | PS |
| 3 Months at 75° C | PS | PS | PS | PS | PS | PS | PS | PS | PS | F | F | F | F | F | R | R | R | R | R |
| 5 Months at 75° C | R | R | R | PS | PS | R | R | PS | PS | PS | PS | PS | R | PS | | | | | |

R—Rejected, not fluid.
F—Fluid.
VF—Very fluid.
PS—Partial set-up.

It can be seen from the storage results that those emulsifiers based upon blends of fatty acids and rosin acids reacted with amine and give the most stable coal and fuel oil slurries.

(1)The coal/fuel oil slurry contains 35% by weight powdered coal and 59% by weight No. 6 fuel oil.

the temperature be allowed to return to approximately 70° to 80° C for the continuation of the reaction.

The time needed for the reaction varies depending on the temperature and the reaction vessel. If the emulsifier is prepared using a static mixer, the reaction time will be on the order of a few seconds. If the materials are blended together with agitation in a large vessel, the time may be as long as 6 hours or longer. Preferably, however, the reaction time should be approximately 1 hour after all of the reactants are brought together in a reaction vessel.

After the emulsifier is formed, it may be stored at any ambient temperature 0° C. The preferred storage temperature for the stabilizing emulsifier is from about 5° C to about 150° C.

After the stabilizing emulsifier is prepared, the coal and fuel oil slurry may be prepared for distribution to the point of use or the emulsifier may be shipped and the coal and fuel oil slurry prepared at the point of use. In either event, the preparation of the fuel blend is similar. Typically, the fuel oil is added to any vessel equipped with a means of agitation. It is preferred that the fuel oil be heated so that it is liquid enough to be stirred thoroughly. The amount of stabilizing emulsifier is added as well as any other desired additives such as wetting agents, anticorrosive agents or additives intended to modify the combustion, the flow or the viscosity of the fuel slurry. Water may be added at this point. However, it is not necessary to add water. Once these materials are blended together, finely divided coal is added and agitation is continued until the coal is dispersed evenly throughout the fuel slurry. This fuel slurry is then ready for use and is storage stable without further agitation for periods of time ranging up to 6 months. The coal fuel oil slurry does not break up at storage temperatures of up to 90° C. If the slurry is stored for extended periods of time, such that some settling may occur, it is easily redispersed with agitation at temperature ranging from 50° to 90° C.

The types of oil which are suitable for use in this invention include all those oils and blends which are currently used to fuel commercial and industrial boilers. These include both the lighter and the heavier fuel oils including No. 6 fuel oil.

While different types of coal perform better than others, all coals may be used. However, the ratio of oil to emulsifier to coal may vary.

Typically, it is possible to use as much as 50 parts coal for each 100 parts of coal and fuel oil used. The most preferable range of coal to fuel oil is from about 30 parts to about 40 parts. However, as little as 1 part pulverized coal may be used.

The minimum amount of stabilizing emulsifier needed to prepare the coal and fuel oil slurry fuel mixtures of this invention may range from about 0.1 part to about 10 parts of the total coal-oil mixture. The exact amount needed will depend upon the nature and type of fuel oil and coal available. Generally, however, from about 0.5 parts to about 5 parts emulsifier are needed to produce storage stable coal and fuel oil slurries.

The addition of water is not mandatory since some of the fuels may contain 5 to 10% water. However, it has been found that it is generally advantageous to use water in amounts ranging from about 1 part to about 25 parts. The water is used to replace a like part of the fuel oil. Preferably, up to about 4 to 10 parts water is used in preparing the stable coal and fuel oil slurry.

The following specific examples, while indicating preferred embodiments of this invention, are given by way of illustration only since various changes and modifications within the spirit and scope of the invention will become apparent to those skilled in the art.

EXAMPLE I

From storage, 1,000 parts of crude tall oil was fed through a heat exchanger into a large steel reaction kettle. While agitating vigorously, the tall oil was heated to 75°–80° C. The, 500 parts of triethanolamine was proportioned into the kettle so that the exothermic reaction did not raise the temperature over 100° C. After the addition was complete, heating was discontinued and the material was agitated for an additional hour. The reaction material was then transferred to storage. The finished product had the following specifications:

| Color | 12, Cloudy |
| --- | --- |
| pH (50% in $H_2O$) | 8.5 |
| pH (as is) | 5 |
| AV (in isopropanol) | 85.1 |
| $H_2O$ cont. % max. | 4.0 |
| Seta-Flash 220° F (104° C) | |
| Solubility in $H_2O$ | Soluble in all prop. |

EXAMPLE II

Crude tall oil was pumped from storage through a proportioning pump and then through a heat exchanger. The heat exchanger raised the temperature of the tall oil to about 70° C. At the same time, triethanolamine was pumped from storage through a proportioning pump. The heated tall oil and the triethanolamine were mixed in a static mixer. The reaction takes place within the static mixer and is slightly exothermic. Residence time within the mixer is a few seconds. To every 2 parts of tall oil used, 1 part of triethanolamine is used at the same time.

EXAMPLES XXVI - XL

Again utilizing the reaction vessel of Example I, additional emulsifiers were prepared as follows:

| EXAMPLE | | XXVI | XXVII | XXVIII | XXIX | XXX | XXXI | XXXII | XXXIII | XXXIV | XXXV | XXXVI | XXXVII | XXXVIII | XXXIX | XL |
|---|---|---|---|---|---|---|---|---|---|---|---|---|---|---|---|---|
| Reaction Temp | °C | RT | RT | 120 | 100 | 200 | 200 | 100 | 200 | 200 | 200 | 200 | 200 | 150 | 100 | 100 |
| $H_2O$ | g. | — | — | — | — | — | — | — | — | — | — | — | — | — | — | — |
| Triethanolamine | g. | 150 | 200 | 150 | 150 | 150 | 200 | 100 | 100 | 126 | 188 | 112 | 150 | 120 | 110 | 100 |
| D | g. | 300 | 200 | 300 | 200 | 300 | 200 | — | — | — | — | — | — | — | — | — |
| FF-Wood Rosin | g. | — | — | — | 100 | — | — | — | 100 | — | 150 | 150 | 100 | 100 | — | — |
| CTO | g. | — | — | — | — | — | — | 200 | 100 | — | — | — | — | 100 | — | — |
| Emery-9877 | g. | — | — | — | — | — | — | — | — | — | — | — | — | — | 150 | 100 |
| A | g. | — | — | — | — | — | — | — | — | — | — | — | — | — | — | — |
| F | g. | — | — | — | — | — | — | — | — | 300 | 150 | 150 | 100 | 100 | 150 | 150 |

F = Mixed blend of palmitic, palmitoleic, stearic and oleic acids from the heads cut from the distillation of crude tall oil containing about 42% fatty acids.
Emery-9877 is a commercially available blend of fatty acids manufactured by Emery Industries, Inc. - Cincinnati, Ohio Results of storage test using the various emulsifiers prepared according to the preceding example:

| EMULSIFIER USED | XXVI | XXVII | XXVIII | XXIX | XXX | XXXI | XXXII | XXXIII | XXXIV | XXXV | XXXVI | XXXVII | XXXVIII | XXXIX | XL |
|---|---|---|---|---|---|---|---|---|---|---|---|---|---|---|---|
| Parts Fuel Oil/Coal Slurry[(1)] | 94 | 94 | 94 | 94 | 94 | 94 | 94 | 94 | 94 | 94 | 94 | 94 | 94 | 94 | 94 |
| Parts Water | 5 | 5 | 5 | 5 | 5 | 5 | 5 | 5 | 5 | 5 | 5 | 5 | 5 | 5 | 5 |
| Parts Emulsifier | 1 | 1 | 1 | 1 | 1 | 1 | 1 | 1 | 1 | 1 | 1 | 1 | 1 | 1 | 1 |
| 1 Week at 75°C | VF | F | F | F | F | F | VF | VF | F | F | VF | F | F | VF | VF |
| 2 Months at 75°C | F | F | PS | F | PS | F | F | F | F | F | F | F | F | VF | F |
| 4 Months at 75°C | F | F | PS | F | PS | PS | F | F | F | F | | | | | |

R—Rejected
F—Fluid
VF—Very fluid
PS—Partial set-up

As in the other examples, various blends of fatty acids and rosin acids given coal/fuel oil slurries which are very storage stable.
[(1)] The coal/fuel oil slurry contains 35% by weight powdered coal and 59% by weight No. 6 fuel oil.

EXAMPLES XLI-XLVII

An additional number of stabilizing emulsifiers were prepared using different sources of crude tall oil and blends of fatty acids and rosin acids.

| EXAMPLE | | XLI | XLII | XLIII | XLIV | XLV | XLVI | XLVII |
|---|---|---|---|---|---|---|---|---|
| Reaction Temp. | °C | 100 | 200 | 100 | 200 | 100 | 100 | 200 |
| Water | g. | — | (25) | — | (90) | — | — | (22) |
| Triethanolamine | g. | 150 | 150 | 80 | 80 | 200 | 150 | 100 |
| A | g. | 300 | 300 | 150 | 150 | 200 | 150 | 100 |
| B | g. | — | — | 200 | 200 | — | — | — |
| C | g. | — | — | — | — | — | 150 | 100 |

A = Northern crude tall oil.
B = Sodium salt of pulp mill liquor containing a mixture of fatty acids and rosin acids.
C = Mixed blend of palmitic, palmitoleic, stearic and oleic acids from the heads cut from the distillation of crude tall oil containing about 42% fatty acids.

The above emulsifiers were used to prepare coal and fuel oil slurries as previously described.

Results of storage tests using the various emulsifiers prepared according to the preceding example:

| EMULSIFIER USED | XLI | XLII | XLIII | XLIV | XLV | XLVI | XLVII |
|---|---|---|---|---|---|---|---|
| Parts Coal and Fuel Oil Slurry | 94 | 94 | 94 | 94 | 94 | 94 | 94 |
| Parts Water | 5 | 5 | 5 | 5 | 5 | 5 | 5 |
| Parts Emulsifier | 1 | 1 | 1 | 1 | 1 | 1 | 1 |
| 1 Week at 75° C | F | F | | | | | |
| 2 Months at 75° C | F | F | F | F | F | VF | F |
| 4 Months at 75° C | F | F | R | PS | F | VF | F |

R—Rejected
F—Fluid
VF—Very fluid
PS—Partial set-up

Again, emulsifiers prepared according to this invention retained good long term stability.

What is claimed is:

1. A storage stable coal and oil fuel mixture comprising (A) from about 0.1 part to about 10 parts of a stabilizing emulsifier comprising reacting at a temperature ranging from about 0° to about 160° C (I) at least one ethylenically unsaturated or ethylenically polyunsaturated aliphatic carboxylic acid or cycloaliphatic carboxylic acid containing from about 5 to about 36 carbon atoms and mixture thereof with (II) at least one member selected from a group consisting of the salt of an organic carboxylic acid, alkali metal hydroxides and alkanolamines with mixing until the reaction between (I) and (II) is complete and (B) from about 50 parts to about 1 part of pulverized coal and (C) from about 50 parts to about 99 parts of liquid petroleum hydrocarbon fuel oil.

2. The storage stable fuel mixture according to claim 1 wherein (I) comprises a mixture of ethylenically polyunsaturated aliphatic carboxylic acids.

3. The stabilizing emulsifier according to claim 1 wherein (I) comprises a mixture of ethylenically unsaturated cycloaliphatic acids.

4. The stabilizing emulsifier according to claim 1 wherein (I) comprises a mixture of (a) ethylenically polyunsaturated aliphatic carboxylic acids and (b) ethylenically unsaturated cycloaliphatic acids.

5. The mixture of acids according to claim 2 wherein the ratio of (a) to (b) may range from 99 to 1 and from 1 to 99.

6. The stabilizing emulsifier according to claim 1 wherein (I) comprises crude tall oil.

7. The stabilizing emulsifier according to claim 1 wherein (I) comprises distilled tall oil.

8. The stabilizing emulsifier according to claim 4 wherein (II) is sodium hydroxide.

9. The stabilizing emulsifier according to claim 4 wherein (II) is potassium hydroxide.

10. The stabilizing emulsifier according to claim 1 wherein (II) is selected from a group consisting of triethanolamine, monoethanolamine, isopropanolamine, and diethanolamine.

11. The stabilizing emulsifier according to claim 7 wherein (II) is triethanolamine.

12. The stabilizing emulsifier according to claim 1 wherein 1 part of (I) is reacted with 2 parts of (II) by weight.

13. The stabilizing emulsifier according to claim 1 wherein 1 part of (I) is reacted with 2 parts of (II) by volume.

14. The storage stable coal and oil fuel mixture according to claim 1 wherein up to 25 parts of water is added.

15. A storage stable coal and oil fuel mixture comprising (A) from about 0.1 parts to about 10 parts of a stabilizing emulsifier comprising reacting at a temperature ranging from about 0° to about 100° C 1 part of (I) crude tall oil with 2 parts of (II) triethanolamine with mixing for a period of time ranging from about 30 seconds to about 3 hours and (B) from about 50 parts to about 1 part of pulverized coal and (C) from about 50 parts to about 99 parts by weight of liquid petroleum hydrocarbon fuel oil.

16. The storage stable coal and oil fuel mixture according to claim 1 wherein up to 25 parts of water is added.

17. The storage stable coal and oil fuel mixture according to claim 10 wherein up to 25 parts of water is added.

18. The combustion of the storage stable coal and oil fuel mixture prepared according to claim 1 to provide heat energy.

19. The combustion of the storage stable coal and oil fuel mixture prepared according to claim 10 to provide heat energy.

20. The combustion of the storage stable coal and oil fuel mixture prepared according to claim 12 to provide heat energy.

21. The combustion of the storage stable coal and oil fuel mixture prepared according to claim 1 to provide heat energy.

22. The combustion of the storage stable coal and oil fuel mixture prepared according to claim 11 to provide heat energy.

23. The combustion of the storage stable coal and oil fuel mixture prepared according to claim 13 to provide heat energy.

* * * * *